July 2, 1929.  E. C. HORTON ET AL  1,719,660
AUTOMATIC WINDSHIELD CLEANER
Filed June 28, 1926  2 Sheets-Sheet 1
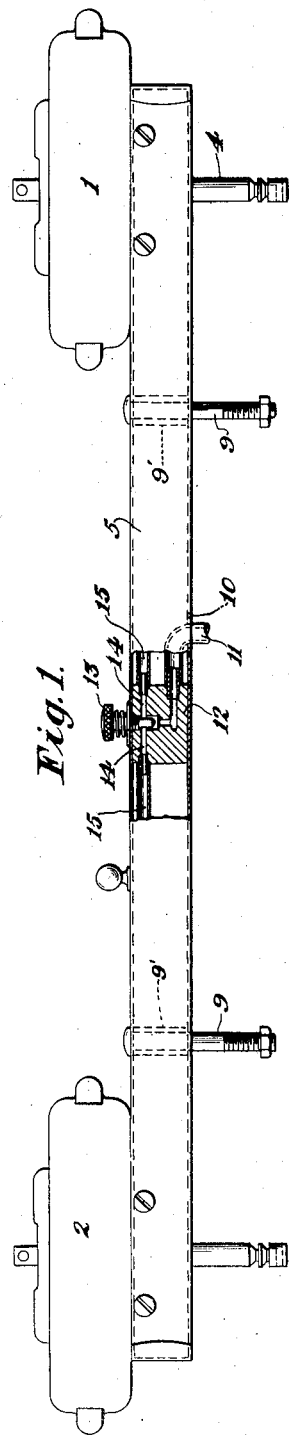
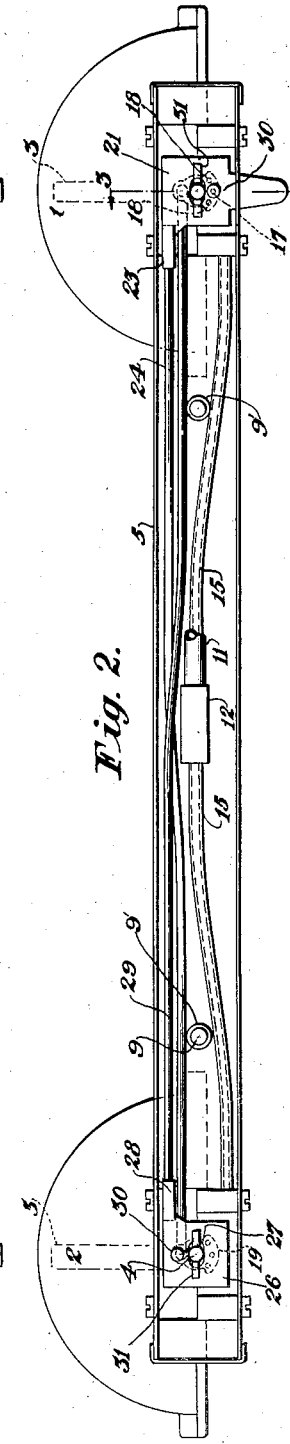
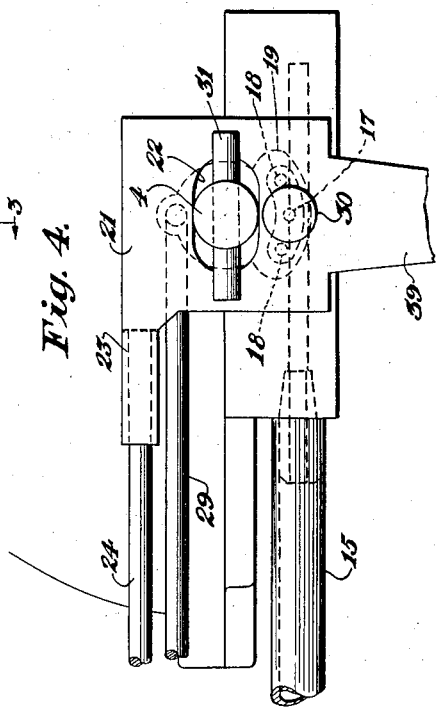
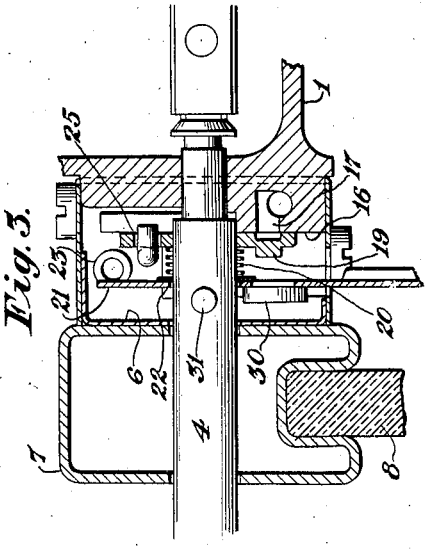
Inventors
Erwin C. Horton
Henry Hueber
Atty.

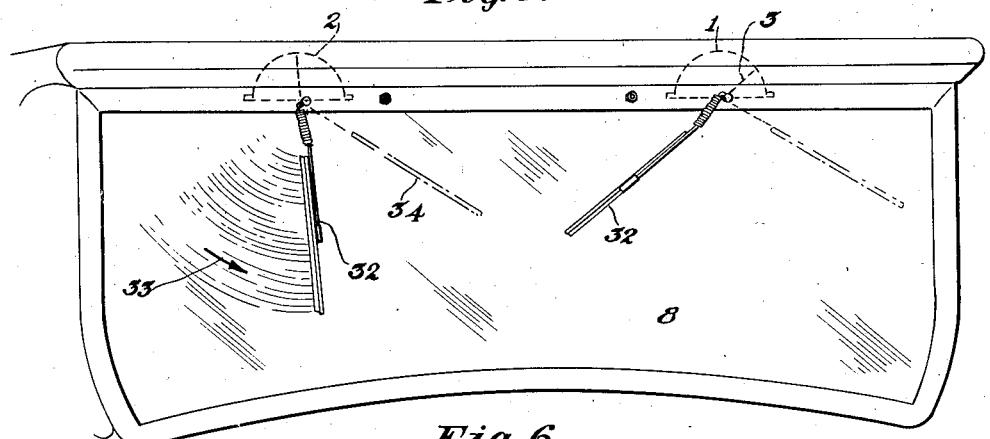
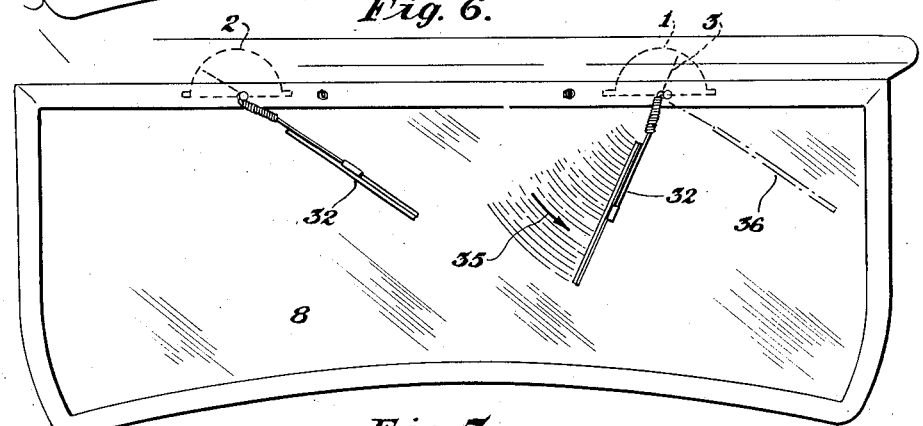
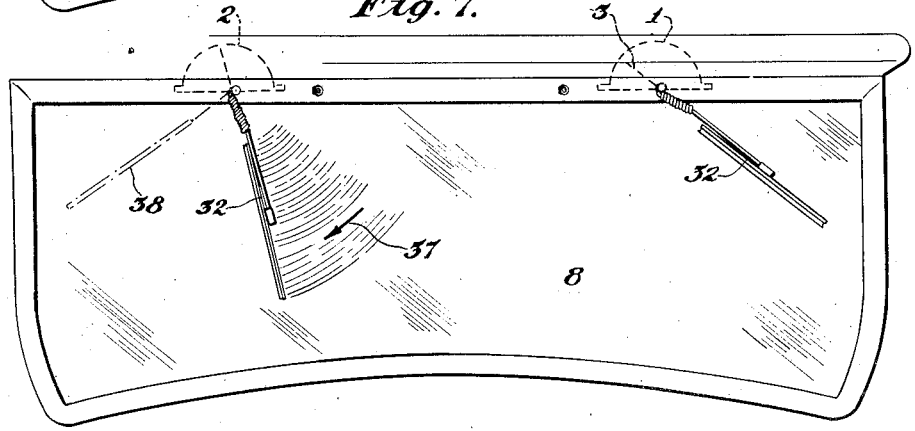

Patented July 2, 1929.

1,719,660

UNITED STATES PATENT OFFICE.

ERWIN C. HORTON, OF HAMBURG, AND HENRY HUEBER, OF BUFFALO, NEW YORK, ASSIGNORS TO TRICO PRODUCTS CORPORATION, OF BUFFALO, NEW YORK.

AUTOMATIC WINDSHIELD CLEANER.

Application filed June 28, 1926. Serial No. 118,994.

This invention relates to automatic windshield cleaners and more especially to that type of cleaners which embodies plural wiping elements.

Various schemes have been resorted to for obtaining a larger field of vision through a windshield, and more particularly with the oscillating type of windshield cleaner. For instance, it has been designed to link an auxiliary wiper to a power operated wiper so as to obtain a clean sweep of a larger area of the windshield, but this arrangement has subjected the motor to such additional load, for which it was not constructed, that the full efficiency of the motor was not obtained. Another dual-wiper practice heretofore resorted to in an endeavor to obtain a broader field of vision through a beclouded windshield has been to mount two separate and distinct motors on the windshield, each operating its own wiper, but both simultaneously calling upon the same source of power which is more or less limited at times. In this latter practice, the limited supply of power is not only rendered less effective by being divided between the two motors, but the control of the two motors is independent of each other resulting in a more or less variable and inconsistent operation of said motors.

The present invention has for an aim to provide a dual-wiper windshield cleaner mechanism embodying two motors which are so correlated that one will control the movement of the other in such manner that each will have the full benefit of the operating power applied thereto.

The invention has for a further object the embodiment, in a windshield cleaner mechanism, of two independent motors, each operating an independent wiper and so related to the companion motor to produce a unique wiper motion wherein the wiper elements are alternately and intermittently actuated. The invention further resides in the provision of a windshield cleaner mechanism having an automatic valve mechanism controlled and operable directly by a fluid pressure motor separate and distinct from the wiper actuating motor to which the valve mechanism is related.

In the drawings;

Fig. 1 is a top plan view showing a windshield cleaner mechanism embodying the present invention, a portion being in section to show more clearly the main control valve;

Fig. 2 is a rear elevation of the improved cleaner mechanism, with the cover plate of the housing removed for showing more clearly the interior of the working mechanism;

Fig. 3 is a detailed vertical sectional view on line 3—3 of Fig. 2 through the valve mechanism of one motor;

Fig. 4 is an enlarged elevational view showing more clearly said valve mechanism, and Figs. 5, 6 and 7 are diagrammatic views designed to illustrate the operation of the improved windshield cleaner.

Referring more in detail to the accompanying drawings, 1 and 2 designate two fluid pressure or suction operated motors, each consisting of a substantially semi-cylindrical casing and a piston or vane 3, which is fixed to a wiper operating shaft 4 journaled therein. These two motors are shown as being mounted on the opposite ends of a box-like housing 5 having a removable cover 6 which fits against the top frame bar 7 of the windshield 8. The wiper shafts 4 project through the frame bar 7 when the housing is attached to the windshield frame by bolts 9 which pass through sustaining spacer sleeves 9' in the housing to relieve the walls intermediate the two motors from excessive clamping strains. The cover 6 is provided with an opening 10 through which a conduit 11 leads from a source of power, such as the intake manifold of an internal combustion engine, to a main control valve block 12, the latter being provided with a manual valve 13 by which communication is established or controlled between the suction passage 11 and a pair of conduits 14 branching in opposite directions through the ends of said valve block. The conduits 14 are connected by piping 15 to the respective motor housings 1 and 2 for establishing communication with a central one of three ports. These ports open through a valve seat 16, and the central or suction port 17 is adapted to be alternately connected, through the laterally arranged casing ports 18, to the opposite ends of the piston chamber of the respective motor, whereby the operating fluid pressure will be applied alternately to the opposite sides of said piston for effecting the operation of the motor. The means employed for shifting or switching the operating power to the opposite sides of the piston comprises a valve 19 which is pivoted on the shaft 4 for oscillating from a position connecting the port 17 to one of the ports 18, to a position connecting said port 17 to the other of said ports 18. The valve is normally urged to its seat by a spring 20 coiled about shaft 4.

To obtain the desired interdependency between the operations of the two motors, suitable means are provided for controlling the valve of each motor from the companion motor. In this instance, a valve tripper plate 21 is slidably mounted in each end of the casing 5, and is provided with a horizontal slot 22 through which the shaft 4 extends whereby said tripper will be supported by the shaft for a horizontal sliding movement. The inner edge of the valve tripper is formed with a sleeve extension 23 for fixedly receiving the adjacent end of a rod 24. The opposite end of the rod is turned inwardly and engaged in an opening 25 (Fig. 3) provided in the valve 19 of the remote motor. A similar tripper plate 26 is provided with a horizontal slot 27 for receiving the shaft 4 of said remote motor, and this tripper is likewise provided with a sleeve extension 28 which fixedly receives a rod 29 connecting the same to the valve 19 of the first motor, as at 25 (Fig. 3). Each tripper plate is provided on its face with a stud 30, and the motor shafts are each provided with a cross pin 31 adapted to have its opposite ends alternately engaging said stud 30 to effect a reciprocation of the respective tripper.

In the operation of the device, let it be considered that the piston 3 in motor 1 is moving clockwise. The cross pin 31 on the shaft 4 of said motor 1 will engage its related stud 30 as the piston approaches its limit of travel in such clockwise direction and slide the valve tripper 21 to the left to shift the valve 19 in motor 2 without disturbing its own valve 19, so that while the application of the fluid pressure in motor 2 is being modified the suction in motor 1 is still being supplied unchanged whereby to continue to urge the piston in a clockwise direction even after said piston has completed its stroke. This continued and unchanged application of suction to motor 1 will hold its piston at the end of its stroke. The shifting of the valve tripper 21 by the cross pin 31 having now changed the position of valve 19 in the remote motor 2, its piston will start a clockwise travel and as it nears the completion of such stroke, its cross pin 31 will engage the stud 30 on the valve tripper 26 and shift the same to the left. This latter motion will, through the connecting rod 29, reverse the position of the valve 19 of motor 1 and cause the reverse application of operating fluid, whereby the piston in said motor 1 will start a counter-clockwise travel while the piston in motor 2 remains stationary or fluid-locked by the continuing application of suction to its piston. As the piston in motor 1 nears its limit of travel in a counter-clockwise direction the opposite end of cross pin 31 will engage the stud 30 to slide the valve tripper 21 to the right, following which the piston in motor 2 will begin traveling a counter-clockwise direction and when it approaches its limit of travel in that direction will effect a change in the position of the valve in the motor 1, and another cycle of movement, as that just described will commence. It will be noted that the moving piston has the benefit of the full supply of power by reason of the fact that the stationary piston remains inoperative until the travel of the former is completed, and that even though suction is still being applied to the inactive piston, in the absence of leakage, this fact will not depreciate the full effect of the power on the moving piston.

Referring more particularly to Figs. 5, 6 and 7 let it be assumed that the motor 1 is at rest while the motor 2 is propelling its wiper 32 (which is attached to the projecting end of its shaft 4) in the direction of the arrow 33, and that when the moving wiper reaches its limit of movement, as indicated by the dotted showing 34 in Fig. 5, it effects a change in the valve of motor 1 so that the wiper 32 of said motor 1 will begin its travel and follow through with a similar counter-clockwise swing, as indicated by the arrow 35 in Fig. 6. When the wiper of motor 1 reaches its limit of movement in a counter-clockwise direction, as indicated by the dotted showing 36 in Fig. 6, the change of position of the valve in motor 2 by motor 1 will cause the wiper of said motor 2 to reverse its movement or to swing in a clockwise direction as indicated by arrow 37, and when said wiper reaches its limit of travel in the clockwise direction, as indicated by the dotted showing 38, the wiper of motor 1 will then begin a reverse oscillation and travel in the clockwise direction as shown in full lines in Fig. 5. It will thus be seen that one wiper is moving while the other wiper is at rest. In other words there is an alternating intermittent movement of the two wipers so that the full benefit of the operating power is applied first to one motor and then to the companion motor. This is especially advantageous in the type of windshield cleaners that are operated by the suction induced in the intake manifold of internal combustion engines of motor vehicles, wherein the degree of suction varies, and at intervals in insufficient to properly operate more than one motor.

The valve tripper 21 may be provided with a finger piece 39 which extends to the outside of the housing 4 whereby its valve may be manually manipulated for effecting a proper parking of the wiper.

What is claimed as new is:

1. A windshield cleaner comprising two fluid pressure motors, each including a piston and a valve adapted to be operated to alternately direct the application of fluid pressure to the opposite sides of the piston; a mechanical connection between the piston of one motor and the valve of the companion motor whereby the valve will be actuated by the movement of the piston; and a wiper operated by each motor.

2. In combination a windshield cleaner comprising two interdependent motors operable at intervals with intervening periods of rest, means for effecting the operation of one motor during the rest period of the companion motor, and a wiper for each motor operable thereby.

3. In combination a windshield cleaner embodying spaced oscillatory wipers, an operator for each wiper, a common source of power for the operators, and means for applying the power alternately to the operators and in rhythm for swinging one wiper in one direction and when it has completed its stroke to swing the other wiper in a corresponding direction, and when this latter wiper has completed its stroke to swing the first wiper in a reverse direction followed by a delayed reverse movement of the second wiper after the first wiper has completed its reverse stroke.

4. In combination a windshield cleaner comprising two fluid pressure motors each having a valve for controlling the operative application of fluid pressure thereto, a wiper for each motor actuated thereby, and means under the control of one motor for actuating the valve of the companion motor.

5. In combination a windshield cleaner comprising two motors, a wiper operated by each, a power-switching member for each motor operable to reverse the application of power to its motor for effecting a reversal in the operation thereof, and an operative connection between each power-switching member and the companion motor whereby one motor will control and operate the power-switching member of the companion motor.

6. In combination a windshield cleaner comprising two motors, a wiper carrying shaft associated with each motor, a power-switching member for each motor movable to reverse the application of power thereto for effecting a reversal of the direction of movement thereof whereby the wiper carrying shaft will be oscillated back and forth, and means operable from one shaft for effecting operative movement of the power-switching member of the companion motor.

7. In combination a windshield cleaner comprising two fluid pressure motors each embodying a casing, a shaft journaled therein, a piston operable in the casing to actuate the shaft, a valve seat on the casing having spaced ports leading into the casing on opposite sides of the piston and an interposed suction port, and a valve movable on the seat to connect the suction port to each of the spaced ports alternately; and means operable by one motor for controllably moving the valve of the companion motor.

8. A windshield cleaner comprising two fluid pressure motors each embodying a casing, a shaft journaled therein, a piston operable in the casing to actuate the shaft, a valve seat on the casing having spaced ports leading into the casing on opposite sides of the piston and an interposed suction port, and a valve movable on the seat to connect the suction port to each of the spaced ports alternately; a tripper movably supported adjacent each casing, a connection between each tripper and the valve of the other motor, whereby movement of the tripper will operably move its valve, and means actuated by each shaft to move the adjacent tripper.

9. A windshield cleaner comprising two fluid pressure motors each embodying a casing, a shaft journaled therein, a piston operable in the casing to actuate the shaft, a valve seat on the casing having spaced ports leading into the casing on opposite sides of the piston and an interposed suction port, and a valve movable on the seat to connect the suction port to each of the spaced ports alternately; a valve tripper on each motor having a slot receiving the adjacent shaft to be movably supported thereby, a connection between each tripper and the valve of the remote motor, and means carried by each shaft for engaging and moving the adjacent tripper.

10. A windshield cleaner comprising a support adapted to be mounted on a windshield, a pair of motors supported thereon in spaced relation, a wiper operable by each motor, a main power control arranged on the support intermediate the motors for controlling the supply of power to both motors, and means under the control of one motor for operatively applying the power to the companion motor as delivered from said main power control.

11. A windshield cleaner comprising a support adapted to be mounted on a windshield, a pair of fluid pressure motors spaced thereon, a wiper operable by each motor, a main valve on the support interposed between a source of suction and the two motors, valve means for controlling the operative application of fluid pressure to each motor, and means operable from one motor for operating the valve means of the other motor.

12. A windshield cleaner comprising a hollow support, a fluid pressure motor mounted at each end on the support, a wiper operable by each motor, a valved conduit arranged within said support for connecting the motors to a source of operating pressure, valve means for each motor arranged within the support, and adapted to be operated to apply the fluid pressure operatively to the respective motor, and valve actuating means disposed within the support adjacent each motor for operation thereby, said valve actuating means being operatively connected to the valve means of the remote motor.

13. A windshield cleaner comprising a hollow support, a motor mounted on each end thereof and each motor having a wiper operating shaft journaled therein, a power-switching member pivoted on each shaft within the support, a tripper movably supported on each shaft within the support, a rod connecting each tripper to the power-switching member on the remote shaft, and means on each shaft for moving the adjacent tripper.

14. A windshield cleaner comprising a hollow support, a motor mounted on each end thereof and each motor having a wiper operating shaft journaled therein, a power-switching member pivoted on each shaft within the support, a tripper movably supported on each shaft within the support; manual control means carried by one tripper and extending to the exterior of the support, means connecting each tripper to the remote power-switching member, and means on each shaft for moving the adjacent tripper.

15. A windshield cleaner comprising a wiper-actuating fluid pressure motor including a valve mechanism operable to reverse said motor, and means for operating said power-switching member including a fluid pressure motor having a valve mechanism controlled by said first motor.

16. In combination a windshield cleaner comprising spaced fluid pressure motors each embodying a casing having a valve seat, a piston operable in the casing, a shaft operable by the piston, said valve seat having spaced ports leading into the casing on opposite sides of the piston and an interposed suction port, and a valve movable on the seat to connect the suction port alternately to each of the spaced ports; a wiper operable by each shaft, a valve tripper for each motor slidably supported adjacent the shaft thereof, said shaft having a play connection with the tripper for actuating the same, each tripper being connected to the valve of the remote motor.

17. In combination a windshield cleaner comprising two fluid pressure motors each embodying a casing, a shaft journaled therein, a piston operable in the casing to actuate the shaft, a valve seat on the casing having spaced ports leading into the casing on opposite sides of the piston and an interposed suction port, and a valve movable on the seat to connect the suction port to each of the spaced ports alternately; a wiper operable by each shaft, a valve tripper on each motor having a slot receiving the adjacent shaft to be movably supported thereby, a connection between each tripper and the valve of the remote motor, and an actuating part on the shaft of each motor for engaging a part of the tripper for shifting the latter.

ERWIN C. HORTON.
HENRY HUEBER.